United States Patent
Zhou et al.

(10) Patent No.: US 11,829,458 B2
(45) Date of Patent: Nov. 28, 2023

(54) IDENTITY RECOGNITION SYSTEM AND METHOD, TERMINAL AND COMPUTER STORAGE MEDIUM

(71) Applicant: CHINA UNIONPAY CO., LTD., Shanghai (CN)

(72) Inventors: Ji'en Zhou, Shanghai (CN); Siyuan Tang, Shanghai (CN); Xi Shen, Shanghai (CN); Jingjing Gao, Shanghai (CN); Jialiang Kang, Shanghai (CN); Zhixiong Tang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 724 days.

(21) Appl. No.: 17/043,953

(22) PCT Filed: Jul. 5, 2019

(86) PCT No.: PCT/CN2019/094784
§ 371 (c)(1),
(2) Date: Sep. 30, 2020

(87) PCT Pub. No.: WO2020/063011
PCT Pub. Date: Apr. 2, 2020

(65) Prior Publication Data
US 2021/0026940 A1    Jan. 28, 2021

(30) Foreign Application Priority Data
Sep. 28, 2018    (CN) .................. 201811138241.7

(51) Int. Cl.
*G06F 21/32*    (2013.01)
*H04W 4/80*    (2018.01)
(Continued)

(52) U.S. Cl.
CPC .............. *G06F 21/32* (2013.01); *G06F 3/017* (2013.01); *G06V 40/20* (2022.01); *G06V 40/50* (2022.01);
(Continued)

(58) Field of Classification Search
CPC .......... G06F 21/32; G06F 3/017; H04W 4/80; G06V 40/20; G06V 40/70; G06V 40/50; G06V 40/15
(Continued)

(56) References Cited

U.S. PATENT DOCUMENTS 7,424,135 B2 * 9/2008 Gifford .................. G06F 21/34
340/5.83
8,159,328 B2 * 4/2012 Luckhardt .............. G07C 9/257
340/5.82
(Continued)

FOREIGN PATENT DOCUMENTS

| CN | 103905566 A | 7/2014 |
|----|-------------|--------|
| CN | 105160739 | 12/2015 |

(Continued)

OTHER PUBLICATIONS

Meservy et al., "Deception detection through automatic, unobtrusive analysis of nonverbal behavior," in IEEE Intelligent Systems, vol. 20, No. 5, pp. 36-43, Sep.-Oct. 2005, doi: 10.1109/MIS.2005. 85. (Year: 2005).*

(Continued)

*Primary Examiner* — Peter C Shaw
(74) *Attorney, Agent, or Firm* — K&L Gates LLP

(57) ABSTRACT

The present disclosure provides an identity recognition system for a terminal. The system includes: an obtaining device configured to obtain pre-stored biometric information corresponding to a user within a preset range of the terminal; a biometric library configured to maintain the obtained (Continued)

pre-stored biometric information; a collection device configured to collect first biometric information of the user; and a recognition device configured to recognize the first biometric information in the biometric library, and decide to enable or disable one or more functions or components of the terminal according to a recognition result. The present disclosure further provides an identity recognition method, a computer storage medium and a terminal.

16 Claims, 3 Drawing Sheets

(51) Int. Cl.

| | | |
|---|---|---|
| *G06F 3/01* | (2006.01) | |
| *G06V 40/20* | (2022.01) | |
| *G06V 40/50* | (2022.01) | |
| *G06V 40/70* | (2022.01) | |
| *G06V 40/10* | (2022.01) | |

(52) U.S. Cl.
CPC .............. *G06V 40/70* (2022.01); *H04W 4/80* (2018.02); *G06V 40/15* (2022.01)

(58) Field of Classification Search
USPC ......................................................... 713/186
See application file for complete search history.

(56) References Cited

U.S. PATENT DOCUMENTS

| | | | | |
|---|---|---|---|---|
| 2004/0088584 A1* | 5/2004 | Shachar | .............. | H04L 63/1416 713/186 |
| 2007/0106895 A1* | 5/2007 | Huang | .................. | H04L 9/3247 713/181 |
| 2020/0010216 A1* | 1/2020 | Devaux | ...................... | B64F 1/00 |
| 2023/0252121 A1* | 8/2023 | Prabhakar | ........ | G06Q 20/40145 713/186 |

FOREIGN PATENT DOCUMENTS

| | | | | |
|---|---|---|---|---|
| CN | 105931325 | A | | 9/2016 |
| CN | 105931327 | | | 9/2016 |
| CN | 107483416 | A | | 12/2017 |
| CN | 108052811 | | | 5/2018 |
| CN | 108109230 | A | | 6/2018 |
| CN | 108230465 | A | | 6/2018 |
| CN | 109697404 | | | 4/2019 |
| EP | 2755148 | A1 | | 7/2014 |
| EP | 3298591 | B1 | * | 4/2022 ............ G06F 21/32 |
| JP | H10105748 | A | | 4/1998 |
| JP | 2003085539 | A | * | 3/2003 ........... A61B 5/0059 |
| JP | 2004324183 | A | * | 11/2004 |
| JP | WO2005055151 | A1 | * | 6/2007 ............... G07C 9/00 |
| JP | 2011113112 | A | | 6/2011 |
| JP | 2016062132 | A | | 4/2016 |
| KR | 20170075780 | A | | 7/2017 |
| KR | 101852599 | B1 | | 4/2018 |
| TW | 201447820 | A | | 12/2014 |
| WO | WO-2016120383 | A1 | * | 8/2016 ......... G07C 9/00087 |
| WO | 2016169432 | | | 10/2016 |

OTHER PUBLICATIONS

Burgoon et al., "Detecting Concealment of Intent in Transportation Screening: A Proof of Concept," in IEEE Transactions on Intelligent Transportation Systems, vol. 10, No. 1, pp. 103-112, Mar. 2009, doi: 10.1109/TITS.2008.2011700. (Year: 2009).*
Ozer et al., "Design of a real-time gesture recognition system: high performance through algorithms and software," in IEEE Signal Processing Magazine, vol. 22, No. 3, pp. 57-64, May 2005, doi: 10.1109/MSP.2005.1425898. (Year: 2005).*
Decision of Refusal dated Nov. 14, 2022 issued for Korean patent application No. 10-2020-7029018.
Second Office Action dated Feb. 18, 2023 issued for Chinese patent application No. 201811138241.7.
The First Office Action dated Nov. 30, 2021 for Japanese Patent Application No. 2020-555419.
The Search Report dated May 21, 2020 for Taiwanese Patent Application No. 108124481.
The First Office Action dated May 26, 2020 for Taiwanese Patent Application No. 108124481.
The Refusal Decision dated Jan. 20, 2021 for Taiwanese Patent Application No. 108124481.
Toshiru, et al., Proposal of an IoT system for promoting the cooperative operation between humans and elevators, technical research report of electronic information communication engineers, Japan, General Incorporated Electronic Information Communication Engineers, Oct. 26, 2017, vol. 117, No. 271, p. 13-18.
Decision of Refusal dated Jun. 21, 2022 issued for Japanese patent application No. 2020-555419.
First Office Action dated Aug. 31, 2022 issued for Chinese patent application No. 201811138241.7.
The Notification of Reason for Refusal dated May 10, 2022 for Korean Patent Application No. 10-2020-7029018.
International Search Report dated Aug. 28, 2019 issued for International PCT Application No. PCT/CN2019/094784.

* cited by examiner

IDENTITY RECOGNITION SYSTEM AND METHOD, TERMINAL AND COMPUTER STORAGE MEDIUM

CROSS REFERENCE TO RELATED APPLICATIONS

This application is a National Stage of International Application No. PCT/CN2019/094784, filed on Jul. 5, 2019, which claims priority from Chinese Patent Application 201811138241.7 entitled "IDENTITY RECOGNITION SYSTEM AND METHOD, TERMINAL AND COMPUTER STORAGE MEDIUM" filed on Sep. 28, 2018. Both of the applications are incorporated herein by reference in their entireties.

TECHNICAL FIELD

The present disclosure relates to identity recognition technology, and particularly relates to an identity recognition system and method, a terminal and a computer storage medium.

BACKGROUND

At present, identity recognition technology is developing rapidly, and the technology maturity has basically met the requirements for recognition accuracy and efficiency in financial applications. The identity recognition technology may be used in payment and public security scenarios, such as Alipay pilot face scan payment, face scan withdrawal launched by Agricultural Bank of China, and the like.

For example, depending on the number of recognition ranges, it is generally considered by the industry that there are two types of technical solutions for face recognition: 1:1 and 1:N. 1:1 means that in the recognition process, face information in a sample picture is known, and a picture to be recognized may be compared with the known sample face picture to determine whether the face in the picture to be recognized is the same face in the sample face picture. 1:N means that in the recognition process, there is a face sample library including N sample pictures, and a face picture to be recognized may be compared with the sample pictures in the library so as to recognize the face picture belongs to a certain sample in the library.

For different scenarios, different technical solutions may be applied. In face scan payment experience stores that have appeared in recent years, users often need to enter additional information such as registered mobile phone numbers, and the face recognition may be used as an auxiliary authentication means to achieve 1:1 authentication. But such an authentication process has an obvious disadvantage. That is, additional information input and interaction from the user may be required and the recognition process may be tedious. In the solutions for subway entry and exit, face recognition technology are generally not used, and most of the solutions still use a public transportation card, quick pass, code scan and other payment forms.

The above information disclosed in the background section of the present disclosure is only intended to improve understanding of overall background of the present disclosure, and should not be deemed to acknowledge or imply in any form that the information constitutes the prior art known to those of ordinary skill in the art.

SUMMARY

The present disclosure is intended to provide an improved identity recognition system and method, a terminal and a computer storage medium. According to an aspect of the present disclosure, an identity recognition system for a terminal is provided. The system includes: an obtaining device configured to obtain pre-stored biometric information corresponding to a user within a preset range of the terminal; a biometric library configured to maintain the obtained pre-stored biometric information; a collection device configured to collect first biometric information of the user; and a recognition device configured to recognize the first biometric information in the biometric library, and decide to enable or disable one or more functions or components of the terminal according to a recognition result.

Optionally, in the identity recognition system as described above, the obtaining device is configured to obtain the pre-stored biometric information of the user and transmit the biometric information to the biometric library, when the terminal is connected to the user's smart device via Bluetooth.

Optionally, in the identity recognition system as described above, the biometric library is configured to delete the pre-stored biometric information from the biometric library when a Bluetooth connection between the terminal and the user's smart device is disconnected.

Optionally, in the identity recognition system as described above, the obtaining device is configured to: determine that the user is within the preset range of the terminal according to latitude and longitude information of the user's smart device; obtain the pre-stored biometric information and transmit the biometric information to the biometric library.

Optionally, in the identity recognition system as described above, the collection device is one or more cameras for collecting a face image of the user.

Optionally, in the identity recognition system as described above, the collection device is a vein collector for collecting a vein biometric image from the user's finger.

Optionally, the identity recognition system as described above further includes: a determination device configured to determine that the user intends to pass through the terminal.

Optionally, in the identity recognition system as described above, the determination device is a gesture sensor configured to determine that the user intends to pass through the terminal according to the user's gesture.

Optionally, in the identity recognition system as described above, the recognition device is configured to decide to enable or disable the determination device according to a result of recognizing the first biometric information in the biometric library.

Optionally, the identity recognition system as described above further includes: a recognition result prompting device configured to prompt desensitized information of the recognized user when the first biometric information is recognized in the biometric library.

According to another aspect of the present disclosure, an identity recognition method for a terminal is provided. The method includes: obtaining pre-stored biometric information corresponding to a user within a preset range of the terminal; maintaining the obtained pre-stored biometric information to form a biometric set; collecting first biometric information of the user; recognizing the first biometric information in the biometric set; and deciding to enable or disable one or more functions or components of the terminal according to a recognition result.

Optionally, in the identity recognition method as described above, the obtaining step includes: obtaining the pre-stored biometric information of the user when the terminal is connected to the user's smart device via Bluetooth.

Optionally, in the identity recognition method as described above, the maintaining step includes: adding the obtained pre-stored biometric information to the biometric set when the terminal is connected to the user's smart device via Bluetooth; and deleting the pre-stored biometric information from the biometric set when a Bluetooth connection between the terminal and the user's smart device is disconnected.

Optionally, in the identity recognition method as described above, the obtaining step includes: determining that the user is within the preset range of the terminal according to latitude and longitude information of the user's smart device; and obtaining the pre-stored biometric information.

Optionally, in the identity recognition method as described above, the collecting step includes: collecting a face image of the user by one or more cameras.

Optionally, in the identity recognition method as described above, the collecting step includes: collecting a vein biometric image from the user's finger by a vein collector.

Optionally, the identity recognition method as described above further includes: determining that the user intends to pass through the terminal.

Optionally, in the identity recognition method as described above, the determining step includes: determining, by a gesture sensor, that the user intends to pass through the terminal according to the user's gesture.

Optionally, in the identity recognition method as described above, the deciding to enable or disable one or more functions or components of the terminal according to a recognition result includes: deciding whether to perform the determining step according to a result of recognizing the first biometric information in the biometric set.

Optionally, the identity recognition method as described above further includes: prompting desensitized information of the recognized user when the first biometric information is recognized in the biometric set.

According to another aspect of the present disclosure, a terminal including the above described identity recognition system is provided.

According to another aspect of the present disclosure, a computer storage medium is provided. The medium includes instructions that, when executed, perform the identity recognition method as described above.

BRIEF DESCRIPTION OF THE DRAWINGS

Through accompanying drawings incorporated herein and specific implementations used together with the accompanying drawings to illustrate certain principles of the present disclosure, other features and advantages of the method and device of the present disclosure will become apparent or clarified more specifically.

DETAILED DESCRIPTION

The following description describes specific implementations of the present disclosure to teach those skilled in the art how to make and use a best mode of the present disclosure. In order to teach principles of the disclosure, some conventional aspects have been simplified or omitted. Those skilled in the art should understand that variations derived from these implementations will fall within the scope of the present disclosure. Those skilled in the art should understand that the following features can be combined in various ways to form multiple variations of the present disclosure. Therefore, the present disclosure is not limited to the following specific implementations, but only limited by the claims and their equivalents.

One or more embodiments of the present disclosure apply biometric recognition technology to the terminal, and constructively propose a strategy for dynamically maintaining a search range for biometric recognition to ensure recognition accuracy. For example, in an embodiment of the present disclosure, only the pre-stored biometric information of the user within the preset range of the terminal is obtained, and then the biometric set is obtained, which can ensure that the size of the sample library (i.e., the biometric set) to be compared is limited when the collection and comparison is subsequently performed, so as to guarantee the accuracy of biometric recognition.

Figure 1:
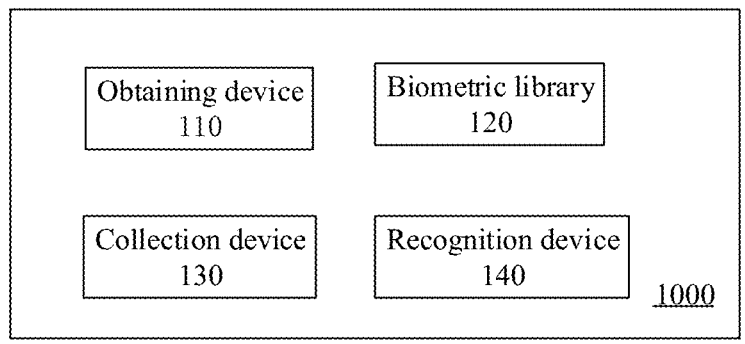
FIG. 1 is a schematic structure diagram showing an identity recognition system according to an embodiment of the present disclosure.

FIG. 1 is a schematic structure diagram showing an identity recognition system according to an embodiment of the present disclosure. As shown in FIG. 1, the identity recognition system 1000 may include an obtaining device 110, a biometric library 120, a collection device 130 and a recognition device 140.

Specifically, the obtaining device 110 may be used to obtain pre-stored biometric information corresponding to a user who is within a preset range of a terminal. In an embodiment, the obtaining device 110 may be configured to use Bluetooth technology to obtain the biometric information of the user within the preset range. For example, the obtaining device 110 may be configured to obtain the pre-stored biometric information of the user and transmit the biometric information to the biometric library 120 when the terminal is connected to the user's smart device via Bluetooth. The obtaining device 110 may be further configured to delete the pre-stored biometric information from the biometric library 120 when the Bluetooth connection between the terminal and the user's smart device is disconnected. Alternatively, the obtaining device 110 may also obtain the pre-stored biometric information of the user within the preset range through other techniques. For example, the obtaining device 110 may be configured to determine that the user is within the preset range of the terminal according to latitude and longitude information of the user's smart device, then obtain the pre-stored biometric information of the user and transmit the biometric information to the biometric library 120.

The biometric library 120 may be used to maintain the obtained pre-stored biometric information. In biometric recognition technology (such as face recognition technology), in order to reduce user interaction, a 1:N solution can be used. For example, a face picture collected by a camera may be compared and searched in a face library. However, due to limitations of current technology, when the number N of data samples in the library is large, accuracy of recognition results may drop significantly. Therefore, in a preferred embodiment of the present disclosure, the biometric library 120 may dynamically maintain a search range during biometric recognition, for example, may only maintain the pre-stored biometric information of the user within the preset range of the terminal, thereby limiting a size of a sample library (also referred to as a biometric set) to be compared so as to ensure accuracy of biometric recognition.

The collection device 130 may be used to collect first biometric information of the user. In an embodiment, the collection device 130 may be one or more cameras for collecting a face image of the user. In another embodiment, the collection device 130 may be a vein collector for collecting a vein biometric image from the user's finger.

The recognition device 140 may be used to recognize the first biometric information in the biometric library 120, and decide to enable or disable one or more functions or components of the terminal according to the recognition result.

Although not shown in FIG. 1, the identity recognition system 1000 may further include a determination device for determining that the user intends to pass through the terminal. In an embodiment, the determination device is a gesture sensor for determining that the user intends to pass through the terminal according to the user's gesture. In an embodiment, the recognition device 140 may be configured to determine whether to enable or disable the determination device according to the result of recognizing the first biometric information in the biometric library 120.

In an embodiment, the above-mentioned identity recognition system 1000 may further include a recognition result prompting device for prompting desensitized information of the recognized user when the first biometric information is recognized in the biometric library.

Figure 2:
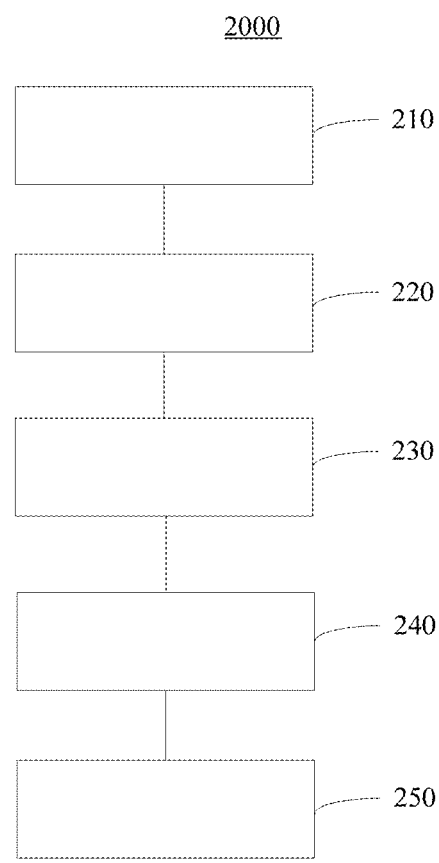
FIG. 2 is a schematic flowchart showing an identity recognition method according to an embodiment of the present disclosure.

FIG. 2 is a schematic flowchart showing an identity recognition method according to an embodiment of the present disclosure. As shown in FIG. 2, the identity recognition method 2000 may include: step 210, obtaining pre-stored biometric information corresponding to a user who is within a preset range of the terminal; step 220, maintaining the obtained pre-stored biometric information to form a biometric set; step 230, collecting first biometric information of the user; step 240, recognizing the first biometric information in the biometric set; and step 250, deciding to enable or disable one or more functions or components of the terminal according to the recognition result.

In an embodiment, in step 210, Bluetooth technology may be used to determine that the user is within the preset range of the terminal. For example, step 210 may include: obtaining the pre-stored biometric information of the user when the terminal is connected to the user's smart device via Bluetooth. Step 210 may also include: adding the obtained pre-stored biometric information to the biometric set when the terminal is connected to the user's smart device via Bluetooth; and deleting the pre-stored biometric information from the biometric set when the Bluetooth connection between the terminal and the user's smart device is disconnected.

In another embodiment, in step 210, latitude and longitude information may be used to determine that the user is within the preset range of the terminal. For example, in this embodiment, step 210 may include: determining that the user is within the preset range of the terminal according to the latitude and longitude information of the user's smart device; and obtaining the pre-stored biometric information.

In step 230, different biometric information of the user may be collected. For example, in an embodiment, step 230 may include: collecting a face image of the user by one or more cameras. In another embodiment, step 230 may include: collecting a vein biometric image from the user's finger by a vein collector.

Although not shown in FIG. 2, in an embodiment, the above-mentioned identity recognition method 2000 may further include: determining that the user intends to pass through the terminal. For example, the determining step may be implemented by a gesture sensor. That is, it is determined according to the user's gesture that the user intends to pass through the terminal. For example, the gesture sensor may sense the user's waving motion, and then determine that the user expresses a subjective intention to enter the station, which can avoid a wrong door opening operation.

In an embodiment, step 250 may include: deciding whether to perform the determining step according to the result of recognizing the first biometric information in the biometric set.

In an embodiment, the above-mentioned identity recognition method 2000 may further include: when the first biometric information is recognized in the biometric set, prompting the desensitized information of the recognized user.

Figure 3:
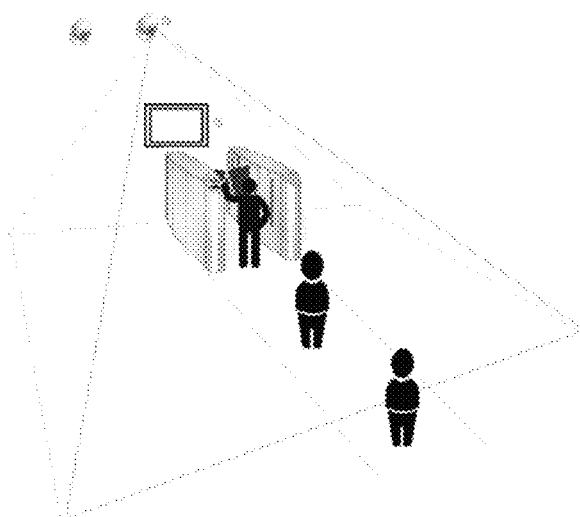
FIG. 3 to FIG. 5 show application scenario diagrams of an identity recognition system according to an embodiment of the present disclosure.
Figure 4:
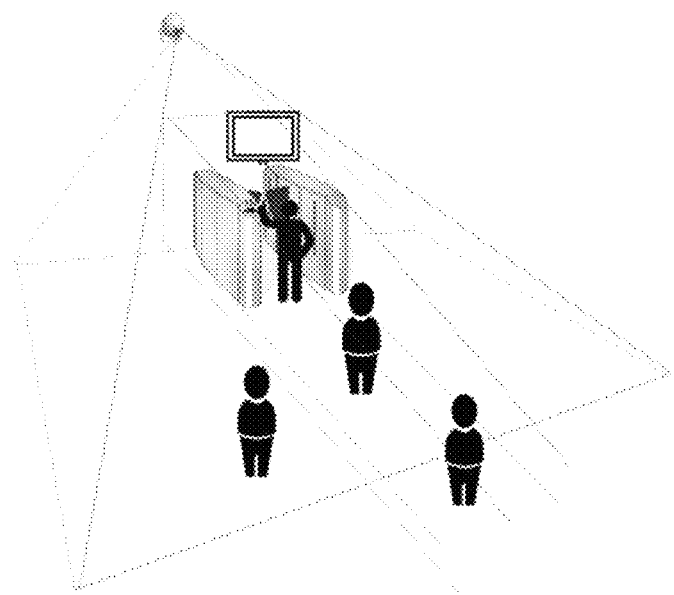
Figure 5:
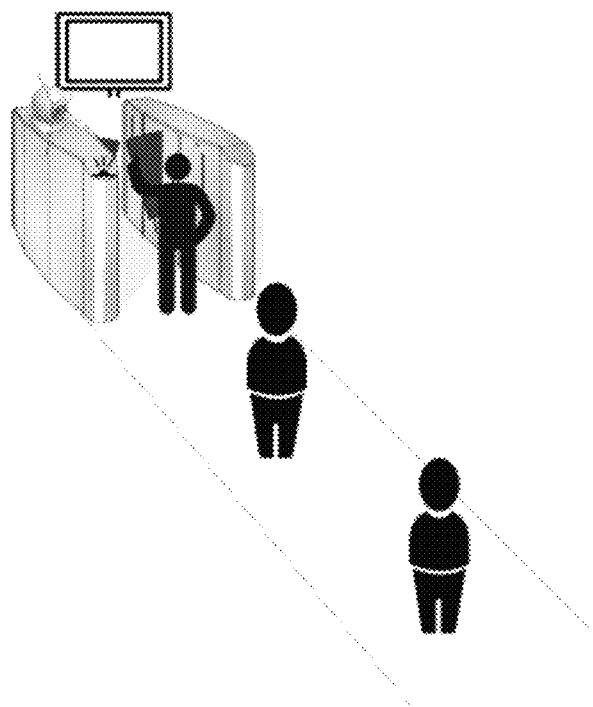

FIG. 3 to FIG. 5 show application scenario diagrams of an identity recognition system according to an embodiment of the present disclosure. It should be pointed out that in the embodiments of FIG. 3 to FIG. 5, the obtaining device may be used to capture face information, and the collection device may be one or more cameras. Those skilled in the art may easily understand that these embodiments are merely illustrative, and the present disclosure is not limited to these specific embodiments, but can be applied to more embodiments or more scenarios. For example, the obtaining device may be used to capture other biometric information, such as vein image information, and accordingly the collection device may be a vein image collector instead of a camera.

As shown in FIG. 3, at an entrance of a terminal (such as a subway gate), one or more face recognition cameras may be installed to capture and track human faces and perform face recognition. The camera coverage may be a certain distance in front of the gate entrance (including the gate), for example, 3-4 meters, and multiple cameras may be deployed according to an actual scenario to guarantee a coverage area for face recognition. The number, position, and type of the cameras may be adjusted according to the actual scenario.

At a conspicuous place at the gate entrance, a face recognition result prompting device may be deployed to display desensitized user identity information recognized by the current system. The form of the prompting device may be not fixed, including but not limited to prompting devices such as a LCD screen and a LED. The prompting device may be also configured with a voice reminding function, which may provide the user with a nice travel experience through a humanized service mode.

In an embodiment, a user gesture sensing device may be installed in the terminal. The physical form of the gesture sensing device may be not fixed. The gesture sensing device may be provided as an infrared light sensing device or other form of equipment to sense the user's gesture of waving and blocking, and may have the following functions:

(1) Prompt for identity recognition status. The system may display different statuses (such as changing the light color) according to a current user's face recognition result. When the user arrives at the gate, if the face recognition has been completed, an operation of waving to open the door may be performed; if the face recognition is not completed, the operation of waving to open the door may be disabled.

(2) Waving to open the door. After the face recognition is successful, the user may block a light sensing device with a hand in front of the gate instead of swiping the original public transportation card, and the system may open the gate to allow passage. The user gesture sensor may be set up because the user may express a subjective intention to enter the station by waving his/her hand, thereby avoiding a wrong door opening operation caused by the presence of a non-passenger user in the camera.

As mentioned above, in order to ensure the accuracy of the recognition results, the number N of the face search library needs to be controlled within a certain range. In an embodiment, for example, in a subway station scenario, by use of a device Bluetooth communication verification method, the recognition range may be dynamically controlled to be a group of users currently present in the subway station instead of all registered users. The specific method is as follows: when a user is registered, in addition to submitting a face picture and binding a bank card, the system may also collect Bluetooth mac information of the registered device and bind face information to the device. Before a passenger enters the subway station, Bluetooth of the mobile phone device of the passenger may be turned on, and the subway gate and the passenger's mobile phone device may be connected through Bluetooth, and the face information corresponding to the device may be added to the dynamic face recognition library through the binding relationship between the mac and the face information. When the passenger is away from the gate and the Bluetooth link is disconnected, the face information corresponding to the device may be removed from the dynamic face recognition library. In this way, the range of face search may be dynamically narrowed to the number of users currently waiting to enter the subway station instead of all registered users, so as to ensure the accuracy of face recognition.

In a preferred embodiment, the user may bind the identity information with the bank card and the device through registration, so that the system can provide convenient services for the user. Through registration, the system may collect the following information:

(1) Device Bluetooth Information

During the user registration, the system may automatically collect the Bluetooth information of the device, such as Mac. The Bluetooth information can uniquely identify a device and play a key role in the subsequent process of reducing the range of face recognition.

(2) User Identity Information

The user identity information may be collected, including name, mobile phone number, and ID number. It may be used to verify an uploaded face picture during registration and display the face recognition result (desensitized).

(3) User Face Information

That is the user's face picture. After the verification is passed, the face picture may be stored in the library and used as a comparison sample for face recognition.

(4) Bank Card Information

Including a name, a bank card number, a phone number reserved in the bank, a SMS verification code and other information, used to verify validity of the bank card at the card issuing bank. After the user enters and exits the gate, the system will deduct fee from the bound card according to the recognition result.

Specifically, during the registration, the system may firstly collect the device Bluetooth information, then collect the user identity information, and then upload the face picture. The system may verify the user identity information and the face picture information through the public security system. After passing the verification, the system may continue to collect the user's bank card information, and the system may send the bank card elements to the card issuing bank for verification. After passing the verification, the system may bind the collected device Bluetooth information, user identity information, face information and bank card information.

The process of a user entering and exiting the station through the gate can be divided into pre-recognition and instant-recognition according to the timing of face recognition. Pre-recognition means that before arriving at the gate, the user has entered a capture range of a face recognition camera and the face recognition is activated, and when the user arrives at the gate, the face recognition has been completed; instant-recognition means that when the user arrives at the gate, the face recognition is activated to recognize the identity of the user. Depending on the number of users appearing in the image captured by the camera, the process of face recognition may be divided into single-user recognition and multi-user simultaneous recognition. For different scenario requirements, different solutions may be applied and accordingly different embodiments may be implemented.

FIG. 4 is a schematic diagram of a scenario of multi-user pre-recognition. As shown in FIG. 4, all passengers approach the terminal before entering the station. The coverage area to be recognized by the camera is a certain area in front of the gate. This area may generally be set to 3-4 meters according to a speed of face recognition and a walking speed of passengers (the specific range may be adjusted according to the station scenario). After the user enters the recognition range, the system may scan multiple faces appearing in the camera image, and recognize these faces. After the users arrive at the gate and wave to enter the station, the system may record the face of the first user in front of the gate as the current inbound person and initiate a billing process.

In an embodiment, the detailed process is as follows: after the user enters the station, the mobile device may connect and communicate with the gate via Bluetooth, and the system may obtain Bluetooth Mac information of the device. The user's device information has been bound with the face picture during the registration, and the corresponding sample may be added to the dynamic face recognition library of the station. The user may approach the gate and enter the face recognition area. The system may simultaneously detect multiple faces, and starts the face recognition. During the process of the user arriving at the gate, the recognition may be completed and the recognition result may be output. The system may calculate the face in the area facing the gate, the size, the coordinate position and other parameters of the face to determine the user among the multiple users who is currently in the front of the gate and is preparing to pass, and may display the desensitized result in the prompt device and place the user gesture sensor in a wave-through state to prompt the user. The user may trigger the user gesture sensor by waving his/her hand to open the gate, and successfully enter the station. At the same time, the system may record the user's entry and exit information, calculate the itinerary, and complete the deduction from the bank card bound during the registration. When the user passes through the gate and gradually moves away from the gate, the Bluetooth may be disconnected as the distance increases. After the Bluetooth is disconnected, the system may remove the corresponding user face information from the dynamic recognition library, thereby controlling the face recognition range within the range of persons currently in the station.

In this embodiment, the user may not need to use a public transportation card, QR code, etc. to enter the station. From the user's perspective, the original card swiping or code scanning action may be replaced by the waving motion. The user does not need to intervene in the recognition process, which may provide the user with a "come and go" and fast gate passing experience, thereby reducing congestion and waiting.

Compared with the multi-user pre-recognition, in the embodiment of single-user pre-recognition, it is necessary to control the path where the passengers pass through the gate and the position of the camera on the physical channel to ensure that only a single user currently passing through the gate appears in the camera during the recognition phase. The other procedures are the same as the multi-user pre-recognition, and will not be repeated.

For the embodiment of single-user pre-recognition, the recognition waiting time may be saved, but it is required to physically guarantee the passage of the single-user path, which may increase the user's passing distance and queue waiting time.

Compared with the multi-user pre-recognition method, the instant-recognition process is relatively simple. The instant-recognition refers to the recognition of a single captured face at the gate.

FIG. 5 shows a schematic diagram of an instant-recognition scenario. In this scenario, the camera may be installed on the gate or close to the gate to ensure that the camera can only capture a single face of the user who is currently entering the station. After the face information is captured, face recognition may be performed to complete the inbound process.

In a specific embodiment, after the user enters the station, the mobile device may connect and communicate with the gate via Bluetooth, and the system may obtain Bluetooth Mac information of the device. The corresponding sample may be added to the face recognition dynamic library of the station. The users may stand in a designated area at the gate to ensure that the gate camera can capture the user currently passing the gate. After the installation of the camera position is adjusted, it should conform to the habits and angles of most users to ensure that the camera can capture the faces of the users passing through the station. The system may start the face recognition, display the desensitized result in the prompt device and place the user gesture sensor in a wave-through state to prompt the user to wave and pass. The user may trigger the user gesture sensor by waving his/her hand to open the gate, and successfully enter the station. At the same time, the system may record the user's entry and exit information, calculate the itinerary, and complete the deduction from the bank card bound during the registration. When the user passes through the gate and gradually moves away from the gate, the Bluetooth may be disconnected as the distance increases. After the Bluetooth is disconnected, the system may remove the corresponding user face information from the dynamic recognition library.

With this embodiment, the user may perform the face recognition only when arriving at the gate. Compared with the pre-recognition method, the recognition process requires the cooperation of the user and has a high perception of the user. The advantage is that the implementation of the solution is simple. Only a single face of the user currently entering the station is involved in the recognition process. Compared with the multi-user pre-recognition, there is no need to calculate which face is waiting in front of the queue among multiple faces.

Therefore, when the technical solution of the present disclosure is applied to a subway scenario, the efficiency of subway entry and exit can be improved, and the problem of crowd congestion during subway entry and exit can be alleviated. In addition, the users do not need to carry a public transportation card or generate a QR code in advance, but only need to enter the recognition range when entering the station, and complete the biometric recognition (such as face recognition) during the process of arriving at the gate. The original card swiping action may be replaced by the waving motion. The system may perform an automatic billing and complete the deduction from the bound bank card, which may provide the user with an "unobstructed" entry service and greatly improve the subway travel experience.

Those skilled in the art should understand that the embodiments of the present disclosure can be provided as a method, a device or a computer program product. Therefore, the present disclosure may be in the form of hardware, software, or a combination of software and hardware. Moreover, the present disclosure may be in the form of a computer program product implemented on one or more computer-usable storage media (including but not limited to disk storage, optical storage, etc.) containing computer-usable program codes.

The present disclosure is described with reference to the flowchart and/or block diagram of the method, the device (platform system), and the computer program product according to embodiments of the present disclosure. The computer program instructions can be provided to a processor of a general-purpose computer, a special-purpose computer, an embedded processing machine, or other editable processing device, so as to generate an instruction sequence for performing a specified operation.

The above examples mainly illustrate various embodiments of the technical solution of the present disclosure in a subway scenario. Those of ordinary skill in the art should understand that the present disclosure can be implemented in many other forms without departing from its spirit and scope, and applied in different scenarios, such as airport scenario, shopping scenario, office building scenario, and the like. Therefore, the examples and implementations as shown are regarded as illustrative rather than restrictive. The present disclosure may cover various modifications and replacements without departing from the spirit and scope of the present disclosure as defined by the appended claims.

What is claimed is:

1. An identity recognition system for a terminal, the system comprising:
    an obtaining device configured to obtain pre-stored biometric information corresponding to a user within a preset range of the terminal:
    a biometric library configured to maintain the obtained pre-stored biometric information;
    a collection device configured to collect first biometric information of the user;
    a recognition device configured to recognize the first biometric information in the biometric library, and decide to enable or disable one or more functions or components of the terminal according to a recognition result; and
    a determination device configured to determine that the user intends to pass through the terminal according to the user's gesture, wherein the recognition device is configured to decide to enable or disable the determination device according to a result of recognizing the first biometric information in the biometric library.

2. The identity recognition system according to claim 1, wherein the obtaining device is configured to obtain the pre-stored biometric information of the user and transmit the biometric information to the biometric library, when the terminal is connected to the user's smart device via Bluetooth.

3. The identity recognition system according to claim 2, wherein the biometric library is configured to delete the pre-stored biometric information from the biometric library when a Bluetooth connection between the terminal and the user's smart device is disconnected.

4. The identity recognition system according to claim 1, wherein the obtaining device is configured to determine that the user is within the preset range of the terminal according to latitude and longitude information of the user's smart device, and obtain the pre-stored biometric information and transmit the biometric information to the biometric library.

5. The identity recognition system according to claim 1, wherein the collection device is one or more cameras for collecting a face image of the user.

6. The identity recognition system according to claim 1, wherein the collection device is a vein collector for collecting a vein biometric image from the user's finger.

7. The identity recognition system according to claim 1, wherein the determination device is a gesture sensor configured to determine that the user intends to pass through the terminal according to the user's gesture.

8. The identity recognition system according to claim 1, further comprising: a recognition result prompting device configured to prompt desensitized information of the recognized user when the first biometric information is recognized in the biometric library.

9. An identity recognition method for a terminal, the method comprising:
obtaining pre-stored biometric information corresponding to a user within a preset range of the terminal;
maintaining the obtained pre-stored biometric information to form a biometric set;
collecting first biometric information of the user;
recognizing the first biometric information in the biometric set;
deciding to enable or disable one or more functions or components of the terminal according to a recognition result; and
determining that the user intends to pass through the terminal according to the user's gesture, wherein the recognition device is configured to decide to enable or disable the determination device according to a result of recognizing the first biometric information in the biometric library.

10. The identity recognition method according to claim 9, wherein the obtaining step comprises: obtaining the pre-stored biometric information of the user when the terminal is connected to the user's smart device via Bluetooth.

11. The identity recognition method according to claim 10, wherein the maintaining step comprises: adding the obtained pre-stored biometric information to the biometric set when the terminal is connected to the user's smart device via Bluetooth; and deleting the pre-stored biometric information from the biometric set when a Bluetooth connection between the terminal and the user's smart device is disconnected.

12. The identity recognition method according to claim 9, wherein the obtaining step comprises: determining that the user is within the preset range of the terminal according to latitude and longitude information of the user's smart device; and obtaining the pre-stored biometric information.

13. The identity recognition method according to claim 9, wherein the collecting step comprises: collecting a face image of the user by one or more cameras.

14. The identity recognition method according to claim 9, wherein the collecting step comprises: collecting a vein biometric image from the user's finger by a vein collector.

15. The identity recognition method according to claim 9, wherein the determining step comprises: determining, by a gesture sensor, that the user intends to pass through the terminal according to the user's gesture.

16. The identity recognition method according to claim 9, further comprising: prompting desensitized information of the recognized user when the first biometric information is recognized in the biometric set.

* * * * *